Figure 1:
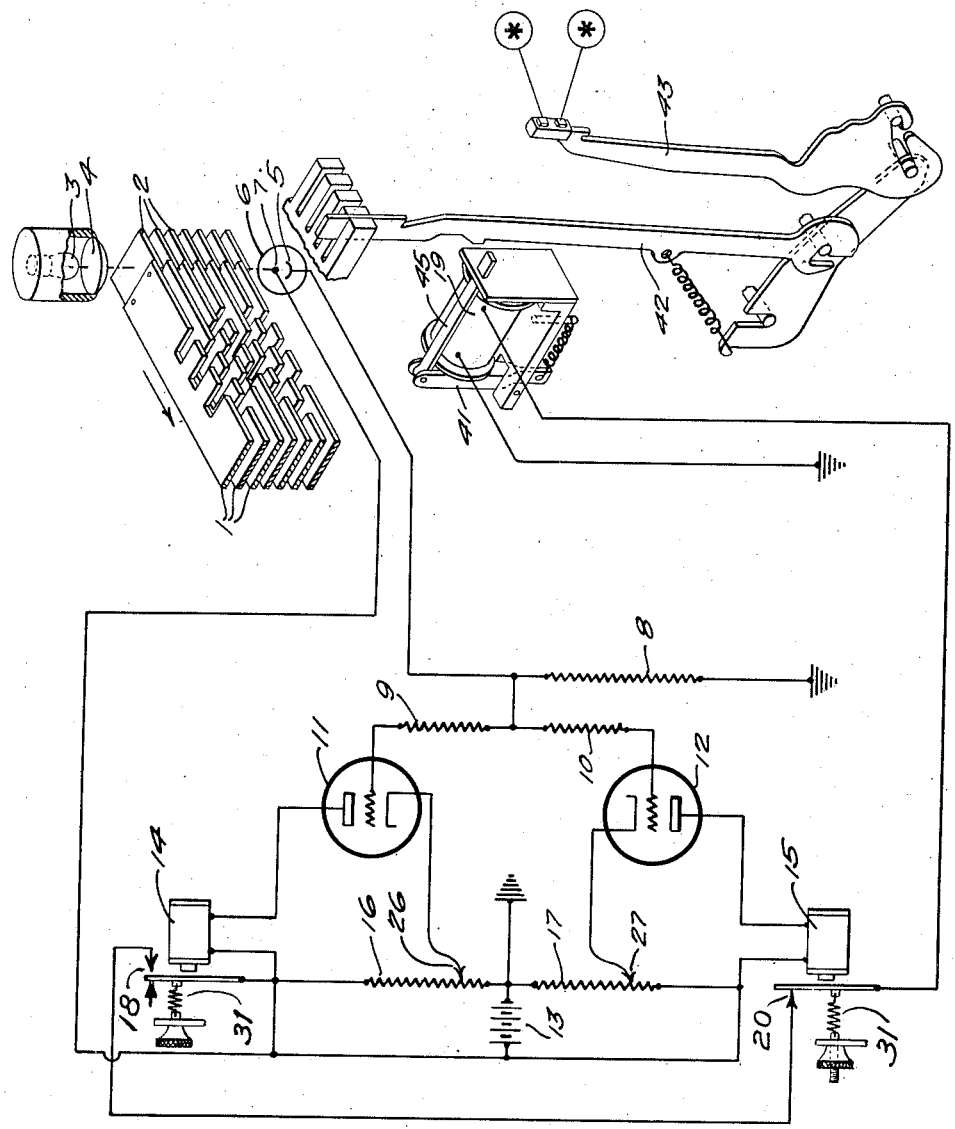

Jan. 2, 1945.  A. L. BROWN  2,366,434
ERROR DETECTOR FOR TELEGRAPH PRINTERS
Filed April 7, 1942  3 Sheets-Sheet 1

INVENTOR
ANDREW L. BROWN
BY H. G. Grover
ATTORNEY

Jan. 2, 1945.  A. L. BROWN  2,366,434
ERROR DETECTOR FOR TELEGRAPH PRINTERS
Filed April 7, 1942  3 Sheets-Sheet 2

INVENTOR
ANDREW L. BROWN
BY H. G. Grover
ATTORNEY

Jan. 2, 1945.   A. L. BROWN   2,366,434
ERROR DETECTOR FOR TELEGRAPH PRINTERS
Filed April 7, 1942   3 Sheets-Sheet 3

INVENTOR
ANDREW L. BROWN
BY H. G. Grover
ATTORNEY

Patented Jan. 2, 1945

2,366,434

UNITED STATES PATENT OFFICE 2,366,434

ERROR DETECTOR FOR TELEGRAPH PRINTERS

Andrew L. Brown, Brooklyn, N. Y., assignor to Radio Corporation of America, a corporation of Delaware Application April 7, 1942, Serial No. 437,955

20 Claims. (Cl. 178—69)

This invention relates to error detectors for telegraph printers. I am aware that error detectors of various types have been used in connection with telegraph printers, particularly those which operate on radio channels. For example, James A. Spencer, in his Patents Nos. 2,153,737 and 2,231,397, which were granted on April 11, 1939, and February 11, 1941, respectively, disclosed the use of error detectors in connection with printers using the so-called "seven unit code." The utility of the seven unit code has been demonstrated for detecting distortion and mutilation of radio signals, since this code has an invariable number of marking elements for each of the code combinations. If, therefore, a signal becomes mutilated by an addition of spurious marking elements or by the drop-out of a significant marking element, the error detector functions to produce an indication such as by printing an error symbol in place of the intended character.

Heretofore, error detection has been accomplished by the use of auxiliary relays which are operative to control circuits in such manner that the number of marking elements in each code signal shall be virtually counted. The error detecting relays may be made operable from segments of a code element distributor, or in place of the counting relays, mechanically actuated contacts may be employed, these contacts being operable directly from the code selector bars of the printer.

When contacts are used in combination with the code selector bars of the printer, the contact assembly must function within very close limits of movement between open and closed positions. Furthermore, the spring load of the contacts which is imposed upon the operation of the code bars is undesirable. Then again, when resistors in parallel circuits are used (in the manner disclosed in the aforementioned Spencer patents) for determining a certain value of current to be fed to the windings of marginal relays, the tolerances in the circuit constants must be maintained within very close limits, and these limits are not always practical. Accordingly, the present invention has for its object to provide an error detecting system which is free from the disadvantages of the systems heretofore known.

It is another object of my invention to provide an error detector which is operable on the principle of measuring the amount of light traversing a series of translucent elements in accordance with the number of printer code bars which are selected.

It is another object of my invention to provide an error detector having photo-cell means for sensing the number of code bars of a printer which may be selected.

Figure 2:
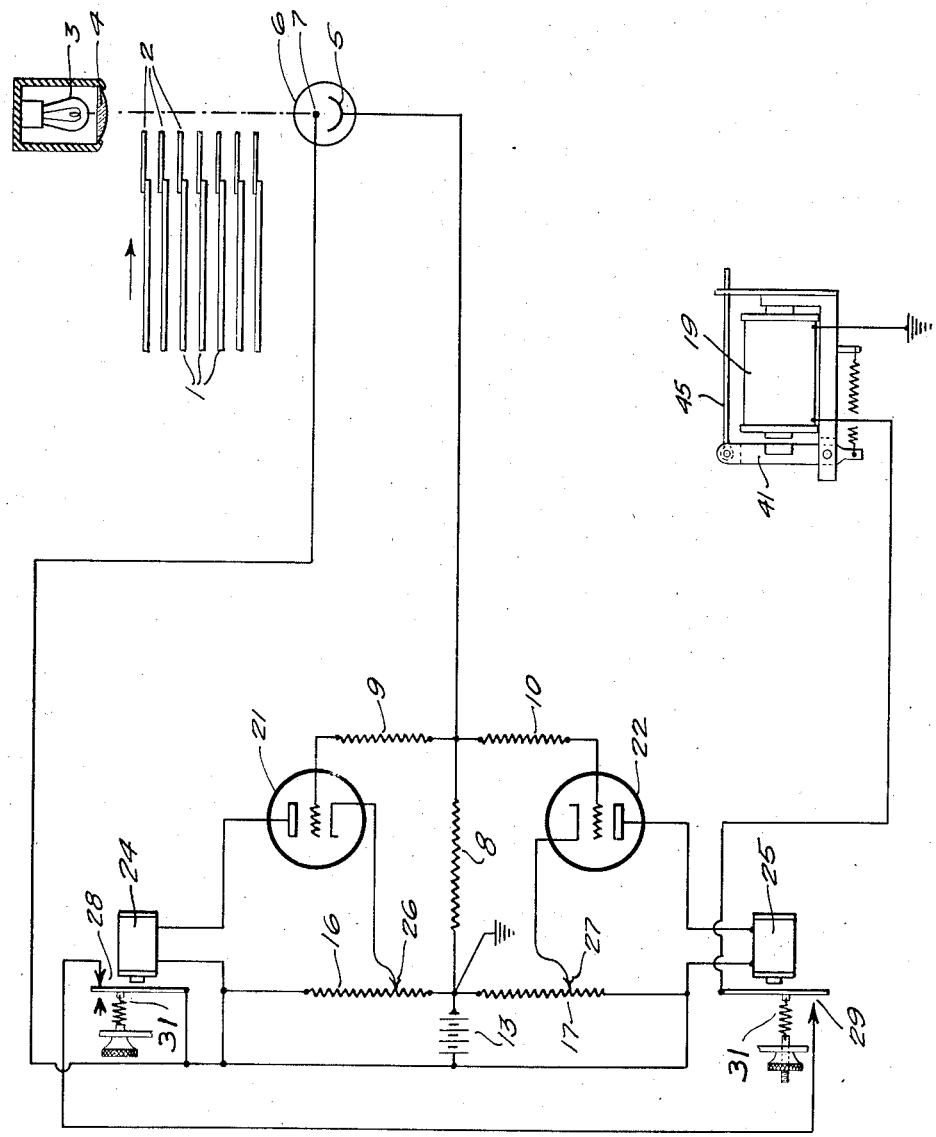
Figure 3:
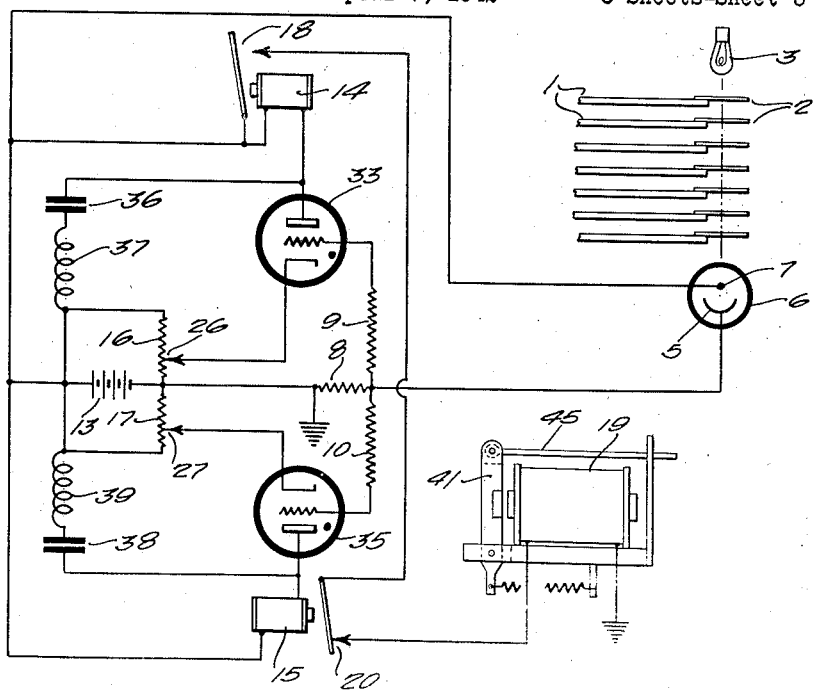
Figure 4:
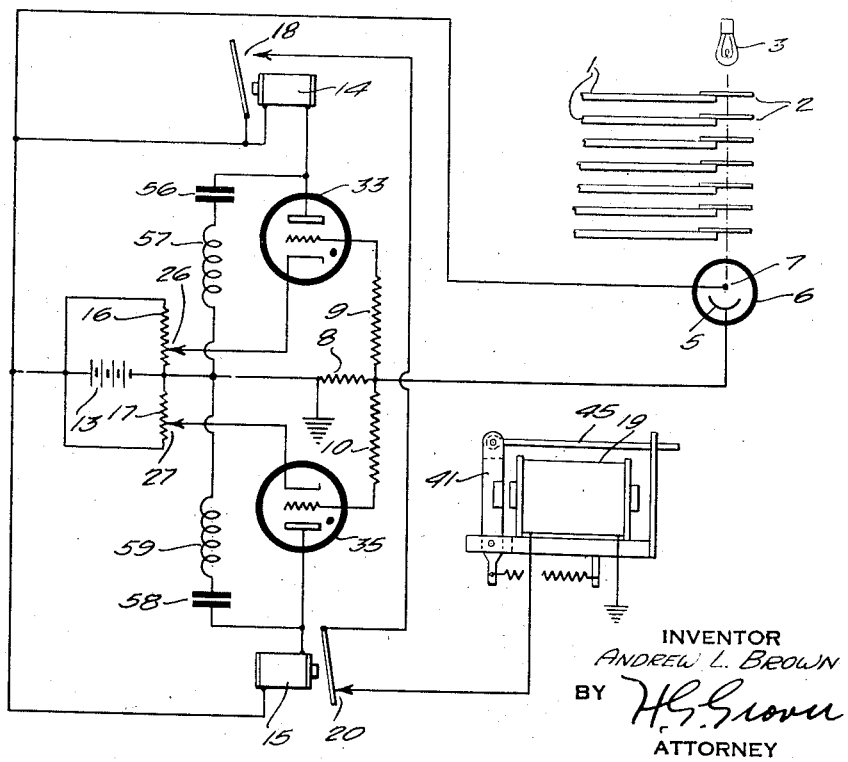

Other objects and advantages of my invention will be appreciated upon reviewing the following detailed description which is accompanied by drawings. In the drawings, Fig. 1 represents schematically a circuit arrangement in association with certain parts of a printer, only those parts being shown which are essential for an understanding of the invention itself, and Figs. 2, 3, and 4 show modifications of the structure and circuit arrangements; Figs. 3 and 4 being illustrative of the application of gaseous discharge tubes.

Referring to Fig. 1, I show therein the ends of seven code bars 1 which are used in a conventional manner for selecting certain selectable elements, or type bars of the printer. According to this embodiment of the invention, let it be assumed that selection is obtained by moving these code bars from right to left as indicated by the arrow. Mounted on each bar is a translucent screen 2, the mounting being such that when the code bars rest in their normal (unselected) position, light is directed in a beam from the source 3 through an optical system 4 and through all seven of the translucent members 2. After traversing these members, the light beam is directed against the cathode 5 of a photo-cell 6.

A definite amount of shading is produced by each of the translucent members 2, so that with all of them in their normal (unselected) position, only a small amount of light reaches the photo-cell 6. As each code bar is selected, more and more light is admitted to the photo-cell.

The photo-cell cathode 5 is connected to ground through a resistor 8 and is also connected through suitable resistors 9 and 10 with the control grids of two discharge tubes 11 and 12 respectively. The anode 7 in the photo-cell 6 is connected to the positive side of a suitable direct current source 13.

The discharge tube 11 possesses an anode in circuit with the winding of a relay 14. Likewise the anode of tube 12 is in circuit with the winding of a relay 15.

In order to adjust the operation of the tubes 11 and 12 for differential control, depending upon the amount of photo-cell output, the cathodes of the tubes 11 and 12 are connected through suitable potentiometers 16 and 17 respectively to both sides of the source 13, the negative side being grounded. When the movable tap 26, which is connected to the cathode of tube 11, is moved towards the negative end of the potentiometer 16, the sensitivity of the tube 11 is increased, since the grid bias is decreased. Therefore, it requires a current of relatively small amplitude as output from the photo-cell 6 across resistor 8 to produce a saturation current in tube 11. The potentiometer tap 26 is accordingly adjusted so that relay 14 in the output circuit of the tube 11 will operate upon the withdrawal of three or more of the code bars 1. The potentiometer 17 should, on the other hand, have its tap 27, which is connected to the cathode of tube 12, adjusted in such manner that a relatively strong current delivered by the photo-cell 6 across resistor 8 will be required to produce a saturation current in tube 12. The proper adjustment of tap 27 is such, therefore, that relay 15 will energize only in response to the selection of four or more of the code bars 1 and the withdrawal of their translucent screens 2 from the path of the light beam.

Relay 14 has contacts 18 which are normally open. Relay 15 has contacts 20 which are normally closed. These contacts 18 and 20 are in a series circuit from the positive side of the source 13 through the error detecting magnet 19 and thence to ground.

The error detecting magnet 19 functions in the same manner as shown and described in the aforementioned Spencer Patent No. 2,231,397. That is to say, when exactly three of the code bars 1 are selected, magnet 19 becomes energized and the movement of its armature drives a control member 45 in a direction to oppose the action of a pull bar member 42. This pull bar member 42 will then be held away from the upward movement of the printing bail (not shown) so as to prevent the actuation of the special type bar 43 which bears an error designating type symbol.

When an error is to be detected, either of two conditions will exist, namely, (1) the number of code bars which are selected is insufficient to cause the actuation of either of the relays 14 and 15; or, (2) the number of selected code bars 1 is in excess of three, in which case both of the relays 14 and 15 will be energized. In the first condition (when neither of the relays 14 and 15 operate) the operating circuit for magnet 19 is open at contacts 18. When both of the relays 14 and 15 operate, the operating circuit for magnet 19 is open at contacts 20. Since the operation of the error detecting pull bar 42 can be prevented only by the energization of the magnet 19 when exactly three of the code bars 1 are selected, it follows that this condition must be met by the output of photo-cell current just sufficient to operate relay 14 without operating relay 15.

Referring now to Fig. 2, the modification therein shown differs from that of Fig. 1 largely in respect to the arrangement of the code bars and their translucent screens 2. According to Fig. 2, the code bars are shown to be moved from left to right when selected. Normally, the screens 2 are withheld from the path of the light beam and are interjected into this path when the code bars 1 are selected.

Prior to the selection and movement of the code bars 1, the light from source 3, focused by the optical system 4, has a clear path to the cathode 5 of the photo-cell 6. Therefore, maximum emission takes place when no code bars 1 have been selected. Under this condition, a potential drop across resistor 8 reduces the bias on the grids of tube 21 and 22 so that saturation current flows in both of these tubes. Tube 21 has its cathode normally carried at a potential which is only slightly positive with respect to the grounded negative terminal of the source 13. On the other hand, the cathode of tube 22 is somewhat more positive than that of the cathode in tube 21, which renders tube 22 less sensitive than tube 21. The sensitivity is adjusted by means of the taps 26 and 27 of the potentiometers 16 and 17 in the same manner as was described in connection with Fig. 1.

The anode of tube 21 is in circuit with the winding of a relay 24 which is fed with positive potential from the source 13. Likewise, the anode of tube 22 is in circuit with the winding of relay 25, one terminal of which is connected to the positive terminal of source 13. Contacts 28 and 29 of relays 24 and 25 respectively are in series in an operating circuit for the error detecting magnet 19. This operating circuit includes the source 13.

In the operation of the circuit arrangement shown in Fig. 2, the error detecting magnet 19 can be energized only when relay 24 remains energized while relay 25 has been de-energized. This condition is met only when exactly three of the screens 2 have been interjected into the path of the light beam so as to reduce the current through the photo-cell 6 to a suitable value for blocking the tube 22 without blocking tube 21.

For detecting errors due to the drop-out of marking elements of the code signals, that is to say, when less than three of the code bars 1 are selected, the photo-cell current will be of sufficient amplitude to maintain a saturation current in both of the tubes 21 and 22. Hence, both of the relays 24 and 25 will be energized and the operating circuit for the error detecting magnet 19 will be opened at contacts 29.

When the error to be detected results from the addition of spurious marking impulses; that is to say, when more than three of the code bars 1 have been selected, then the photo-cell current is reduced to a value such that both of the tubes 21 and 22 are blocked. Both relays 24 and 25, therefore, de-energize and the operating circuit for the error detecting magnet is opened at contacts 28.

As has been previously explained in reference to Fig. 1, the de-energization of the error detecting magnet 19 causes member 45 to be withdrawn from the path of the pull bar 42 so that this bar may be uplifted by the printer bail for causing the error type bar 43 to print its characteristic symbol.

The use of the gaseous discharge tubes in place of vacuum tubes is illustrated in two embodiments as shown in Figs. 3 and 4 respectively. I will first describe the operation of the embodiment shown in Fig. 3.

The gaseous discharge tubes 33 and 35 in Fig. 3 are substituted for the vacuum tubes 11 and 12 of Fig. 1. A resonant circuit consisting of capacitor 36 in series with inductance 37 is connected between the anode of tube 33 and the positive terminal of the source 13. This resonant circuit is, therefore, in shunt with the winding of relay 14. Similarly, the resonant circuit consisting of capacitor 38 and inductance 39 is connected between the anode of the gaseous discharge tube 35 and the positive terminal of the source 13. This resonant circuit is likewise in shunt with the winding of relay 15. The other details of the circuit arrangement in Fig. 3 are exactly the same as shown in Fig. 1 and need not, therefore, be described.

The values of capacitance and inductance in the resonant circuits are suitably adjusted for causing the tubes 33 and 35 after ignition to conduct current for a limited time so as to actuate one or both of the relays 14 and 15. The oscillating circuit 36—37 will, however, render the tube 33 non-conducting after an interval predetermined by the electrical period of inductance 37 and capacitor 36. This period may be adjusted so that if the magnet 19 is to be energized, it will be held in energized position until the printer cycle has been substantially completed. At this time the mechanism of the printer will cause the restoration of the code bars 1 to their normal positions and a new cycle of code bar selection will commence. The electrical period of the resonant circuit 38—39 is made the same as that of the resonant circuit 36—37.

The technique of extinguishing the gaseous discharge tubes 33 and 35 as required for the operation of the embodiment shown in Fig. 3 is set forth with considerable detail in a book "Theory and Applications of Electron Tubes," published in 1939 by McGraw-Hill Book Company, Inc., the author being Herbert J. Reich. Reference is here made to page 438 and to Figs. 12–40 for a similar circuit arrangement which extinguishes a gaseous tube.

As shown in Figs. 12–37 on page 435 of the same book by Reich, a relaxation control circuit for extinguishing a gaseous discharge tube may consist of series inductance and capacitance connected between the anode and the negative terminal of the source. Another modification of my invention is, therefore, suggested by this arrangement and is herein shown in Fig. 4. In this case, the inductive elements 57 and 59 are connected respectively in series with the capacitors 56 and 58.

In the operation of my invention according to Fig. 4, the capacitor 56 becomes charged before the tube 33 is ignited. Capacitor 56 discharges suddenly through the tube 33 and reduces the anode potential to so low a value that the tube immediately becomes extinguished. The cyclic operation of the resonant circuit will repeat itself so long as the control from the photoelectric current 6 persists. The periodicity of the cyclic operation can easily be made so rapid that the armature of relay 14 will not release. The characteristics of relays 14 and 15 should, therefore, be adjusted in accordance with conventional practice in the design of alternating current relays.

As another modification of my invention it will be clear to those skilled in the art that when the selecting movements of the code bars 1 are from left to right (instead of from right to left as shown in Fig. 1) a clear path for the light beam may be afforded by perforations or other orifices in the translucent screens 2. By this arrangement the movement of each code bar to its selecting position will bring an orifice into registry with the axis of the light beam and thus will increase the photo-electric response. Hence the circuit arrangement shown in Fig. 1 will function exactly as heretofore described by reference thereto.

In another modification of my invention, gaseous discharge tubes may be substituted for the vacuum tubes 11 and 12 and means well known in the art would be provided for opening the anode circuits of the gaseous discharge tubes as a function of a printing operation. Conventional printers embody a code-bar restoring lever and contact springs operable by such a lever after a type bar has been selected. I, therefore, propose to add a pair of circuit-breaking contacts to the contact springs heretofore used, and to connect these circuit breaking contacts between the source 13 and the windings of relays 14 and 15. I have not, however, illustrated this modification since the use of vacuum tubes renders the device completely operable as shown in the drawings, and the use of gaseous discharge tubes merely serves to render the adjustment of the armature-restoring springs 31 less critical. This is obvious from the fact that in a vacuum tube the anode current is fairly proportional to the change in grid bias resulting from the photo-cell output; whereas, in a gaseous tube no anode current flows until a critically low bias is applied to the grid, after which the anode current flows steadily at an amplitude which is fixed by the circuit constants.

Other modifications of the invention will be apparent to those skilled in the art. For example, it may be desirable to place the light screens 2 in windows or openings within the body of each code bar 1. This arrangement would facilitate the mounting of the code bars 1 in suitable combs and would afford a measure of frame protection to the translucent screens 2. Still other modifications might include different arrangements of the contacts of relays 14 and 15 or relays 24 and 25, so that the error detecting magnet 19 would de-energize when exactly three code bars are selected. In this case, the member 45 would operate in the reverse direction from that herein shown; but by turning the armature 41 toward the pull bar 42, the same results would be obtained in controlling the error detecting type bar 43.

The precise details of structure and circuit arrangements as herein shown are merely illustrative, and the scope of the invention is limited only in accordance with the claims.

I claim:

1. In combination, a marginal relay circuit arrangement operable to denote the occurrence of a photo-electric response of a magnitude which lies between predetermined maximum and minimum limits, a photo-electric cell for producing said response, a constant light source directed toward the photo-sensitive element of said cell, and a plurality of translucent members having uniform shading density arranged to be individually moved into and out of the light path between said cell and said light source, said translucent members constituting means normally operable to confine said photo-electric response to said predetermined limits and abnormally operable to produce a photo-electric response outside said predetermined limits.

2. The combination according to claim 1 in which said translucent members are mounted on the code selector bars of a telegraphic printer.

3. The combination according to claim 1 and including an error detector mechanism and means for causing said circuit arrangement to actuate said mechanism when said photo-electric response departs from said predetermined limits.

4. The method of producing an indication of a photo-electric response of a magnitude which lies above or below a predetermined intermediate range of magnitudes, by means of a constant light source, a photo-electric cell disposed in a light path from said source, a plurality of translucent members having uniform shading density, and a marginal relay device in circuit with said cell, which method comprises interjecting a variable number of said translucent members into the light path, causing the resultant photo-electric response at times to obtain one circuit opening in said relay device, and at times to produce a second circuit opening therein, whereby said indication is made in either case.

5. An error detector for a printing telegraph system comprising a constant light source, a photo-electric cell, a plurality of translucent screens movable into and out of the light path between said source and said cell, each screen being supported by and movable with a code selector bar of a printer, a pair of normally blocked electron discharge devices each having an input circuit subject to control by a respectively different predetermined magnitude of light-responsive action of said photo-electric cell, a relay in the output circuit of each said discharge device, a type bar bearing an error symbol, means operable upon reception of a mutilated signal for causing said type bar to be actuated, means operative when a predetermined number of said screens is disposed in said light path for unblocking one only of said discharge devices, thereby to actuate a predetrmined one of said relays, and means controlled by the operation of said one relay, the other relay being unaffected, for preventing the actuation of said type bar.

6. In receiving apparatus responsive to code combinations of selecting and non-selecting elements, a light filter having a plurality of translucent elements of uniform density, a photo-electric cell, a source of light rays projected toward said cell, means responsive to the reception of different elements of said code combinations for independently adjusting said translucent elements within and without the path of projection of said rays, and error detecting means controlled by the electrical output from said cell to denote departures from a predetermined number of selecting elements in the received code combination as evidenced by the interjection of an abnormal number of said translucent members into said path.

7. In receiving apparatus responsive to code combinations of selecting and non-selecting elements, a light filter having a plurality of translucent elements of uniform density, a photo-electric cell, a source of light rays projected toward said cell, means responsive to the reception of different elements of said code combinations for independently adjusting said translucent elements within and without the path of projection of said rays, and error detecting means controlled by the electrical output from said cell to denote departures from a predetermined number of selecting elements in the received code combination as evidenced by the withdrawal of an abnormal number of said translucent members from said path.

8. In an error detecting device for a telegraph printer, a photo-electric cell, a source of light to which said cell is exposed, a plurality of laminated translucent screening members individually settable within and externally to the light path between said source and said cell, means responsive to the reception of an unmutilated code signal consisting of selecting and non-selecting elements, the ratio between which is normally fixed, for setting within said light path only those of said translucent members which correspond with said selecting elements, an error indicator, means controlled during a type-printing cycle of said printer for actuating said error indicator, and means controlled by the magnitude of electrical output from said photo-cell, in response to the reception of said unmutiliated code signal, for preventing the actuation of said error indicator.

9. The combination according to claim 8 and including means for causing the error indicator actuating means to be released upon the reception of a mutiliated code signal comprising an abnormal number of selecting elements.

10. An error detecting device for a telegraph printer, comprising a photo-electric cell, a source of light to which said cell is exposed, a plurality of laminated translucent screening members individually settable within and externally to the light path between said source and said cell, a set of code bars in said printer, each operable in response to the reception of a marking impulse of a code signal, each of said translucent members being settable by an appropriate one of said code bars, an error indicating mechanism, means responsive to a predetermined magnitude of output current from said photo-cell for locking out said error indicator mechanism, and means operable in response to the screening of said photo-cell by more or less than a predetermined number of said translucent members for causing said error indicator mechanism to operate.

11. The method of automatically indicating the reception of a mutilated code signal having an abnormal ratio between its selecting and non-selecting elements, which comprises varying the magnitude of a photo-electric response in accordance with a departure of a received code signal from a fixed normal ratio between its selecting and non-selecting elements, and making an error indication only upon the occurrence of such a departure.

12. In the operation of a telegraph printer having a code selector member for each element of an equal length signal to be decoded, and having type members, one of which bears an error-designating symbol, the other type members bearing a font of type, the method of controlling said error-designating type member which comprises producing a photo-electric response the magnitude of which is a function of the number of code-selector members actuated to represent the marking elements of a given code signal, utilizing said photo-electric response to lock out said error-designating type member whenever a type member bearing a character from said font is to be selected, and causing departures from normal of the magnitude of said photo-electric response to release said error-designating type member for actuation.

13. In combination, a marginal relay circuit arrangement operable to detect the occurrence of an electrical condition of a magnitude which lies between predetermined maximum and minimum limits, a pair of normally blocked electron discharge devices each having an input circuit subject to control by a respectively different predetermined magnitude of said electrical condition, a relay in the output circuit of each discharge device, electromagnetic responsive means connected to an operating current source through a series circuit which includes the armatures of both said relays, but only when the relay which is in circuit with the more sensitive of the two electron discharge devices is energized and when the relay which is in circuit with the less sensitive electron discharge device remains unenergized, said marginal relay circuit arrangement being further characterized in that said responsive means becomes open-circuited by the simultaneous energization of both said relays and also by failure of both said relays to operate.

14. The combination according to claim 13 in which a photo-electric device is provided for varying the magnitude of said electrical condition, and said photo-electric device is constituted as means for controlling the bias on the respective input circuits of said electron discharge devices.

15. The method of producing an indication of an electrical condition of a magnitude which lies below or above a predetermined intermediate range of values by means of a pair of electron discharge devices one of which is controlled by the removal of a lesser cut-off bias than that which controls the other, and where each electron discharge device has in circuit therewith a relay the armatures of which are closable one against an active front contact and the other against an active back contact, said front and back contacts of the respective relays being in series with a responsive means and with an operating current source, which method comprises causing an electrical condition of a magnitude less than the lowest value in said range to maintain a blocking bias on both of said tubes, whereby both of said relays stand unenergized and said series circuit through their armatures and through said responsive means remains open, and causing an electrical condition of a magnitude greater than the highest value in said range to remove the blocking bias from both said discharge tubes, whereby both relays are energized and said series circuit through said responsive means likewise remains open, the closure of said circuit being obtained only when said electrical condition is of a magnitude within said range of values.

16. In a device for differentiating between the occurrence of an electrical condition the magnitude of which lies between two limiting values and the occurrence of an electrical condition the magnitude of which lies above or below the range of said limiting values, a pair of discharge devices each having an input circuit and an output circuit, means operative to maintain a cut-off bias on both said input circuits in the presence of the second said electrical condition when it is of a magnitude below said range, means responsive to the first said electrical condition for unblocking one only of said discharge devices, said unblocking means being also effective upon both said discharge devices in response to the second electrical condition when its magnitude is above said range, a relay in the output circuit of each discharge device, and an electrical responsive means energizable under control of contacts on the two said relays when one of the same is energized while the other remains unenergized.

17. The combination according to claim 16 and including an optical system and a photo-electric device for determining the magnitude of the existing electrical condition.

18. The combination according to claim 16 in which said discharge devices are of the gaseous type, and time constant means are provided for extinguishing said discharge devices after they have been caused to strike by application of an unblocking bias.

19. The combination according to claim 16 in which said discharge devices are of the gaseous type, and resonant circuit means are provided for producing repeated discharge and extinction states in said devices during the application of an unblocking bias.

20. In a printing telegraph apparatus, code elements shiftable to control the selectively recording operation of said apparatus, selectable elements cooperating with said code elements and selectable thereby, an electronic circuit arrangement for defining two space discharge paths, means for differentially controlling the discharges in said paths, said means being operable in dependence upon the number of said code elements which are shifted, two relays each having a winding in circuit with an appropriate one of said discharge paths, and a recording element operable under joint control of said relays when neither of said relays, and also when both of said relays, are caused to be simultaneously energized, thereby to produce an error indication in lieu of a recording by one of said selectable elements.

ANDREW L. BROWN.